United States Patent [19]
Shtivelman

[11] Patent Number: 6,157,655
[45] Date of Patent: Dec. 5, 2000

[54] METHOD FOR ESTIMATING TELEPHONY SYSTEM-QUEUE WAITING TIME IN AN AGENT LEVEL ROUTING ENVIRONMENT

[75] Inventor: Yuri Shtivelman, Belmont, Calif.

[73] Assignee: Genesys Telecommunications Laboratories, Inc., San Francisco, Calif.

[21] Appl. No.: 09/209,306

[22] Filed: Dec. 11, 1998

Related U.S. Application Data

[63] Continuation-in-part of application No. 09/024,825, Feb. 17, 1998.

[51] Int. Cl.⁷ .................................................. H04M 3/00
[52] U.S. Cl. ........................ 370/412; 379/309; 379/266; 370/252
[58] Field of Search .............................. 379/34, 265, 266, 379/309, 268, 272, 308; 370/412, 252

[56] References Cited

U.S. PATENT DOCUMENTS

| | | | |
|---|---|---|---|
| 4,788,715 | 11/1988 | Lee | 379/266 |
| 5,020,095 | 5/1991 | Morganstein et al. | 379/266 |
| 5,467,391 | 11/1995 | Donaghue, Jr. et al. | 379/265 |
| 5,506,898 | 4/1996 | Costantini et al. | 379/266 |
| 5,822,400 | 10/1998 | Smith | 379/265 |
| 5,905,793 | 5/1999 | Flockhart et al. | 379/266 |
| 5,982,873 | 11/1999 | Flockhart et al. | 379/266 |
| 5,991,392 | 11/1999 | Miloslavsky | 379/265 |
| 6,044,146 | 3/2000 | Gisby et al. | 379/265 |
| 6,046,762 | 4/2000 | Sonesh et al. | 379/265 |

*Primary Examiner*—Ricky Ngo
*Assistant Examiner*—Maikhanh Tran
*Attorney, Agent, or Firm*—Donald R. Boys; Central Coast Patent Agency

[57] ABSTRACT

A system for estimating call waiting time for a call in a queue takes into account multiple queues wherein agents are shared between queues, abandoned call history, and virtual and priority queues. The system in a preferred embodiment is a computer-telephony integration (CTI) software application adapted to execute on a CTI processor, which may be coupled to switching equipment at network level in a connection-oriented, switched telephony (COST) network or to a switch at call-center level, or both.

8 Claims, 3 Drawing Sheets

Skill-Based Priority

METHOD FOR ESTIMATING TELEPHONY SYSTEM-QUEUE WAITING TIME IN AN AGENT LEVEL ROUTING ENVIRONMENT

CROSS-REFERENCE TO RELATED DOCUMENTS

The present invention is related in part to a co-pending patent application Ser. No. 09/024,825 entitled Method and Apparatus for Call Distribution and Override With Priority, which was filed on Feb. 17, 1998, and this prior document is incorporated herein by reference in its entirety.

FIELD OF THE INVENTION

The present invention is in the field of Computer Telephony Integrated (CTI) communication systems including both connection-oriented, switched telephony (COST) systems and Data Network Telephony (DNT) systems such as Internet-Protocol-Network-Telephony (IPNT) systems, and pertains more particularly to methods and apparatus for estimating call waiting time for queues in skill-based agent level routing (ALR) environments.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventors and to those with skill in the art in general. For this reason, much minute detail of known systems is not reproduced here, as to do so may tend to obscure the facts of the invention.

At the time of filing the present patent application there continues to be remarkable growth in telephone-based information systems. Recently emerging examples are telemarketing operations and technical support operations, among many others, which have grown apace with development and marketing of, for example, sophisticated computer equipment. More traditional are systems for serving customers of large enterprises, such as insurance companies and the like. In some cases enterprises develop and maintain their own telephony operations with purchased or leased equipment, and in many other cases, companies outsource such operations to firms that specialize in such services.

In a call center, a relatively large number of agents handle telephone communication with callers. Each agent is typically assigned to a telephone connected to a central switch, such as a PBX, which is in turn connected to a public-switched telephone network (PSTN), well-known in the art. The central switch may be one of several known types.

An organization having one or more call centers for serving customers typically provides one or more telephone numbers to the public or to their customer base, or both, that may be used to reach the service. These numbers are frequently of the no-charge-to-calling-party variety. The number or numbers may be published on product packaging, in advertisements, in user manuals, in computerized help files, and the like. There are basically two scenarios. If the organization providing the service has a single call center, the number may be to the call center, and all further routing to an agent will be at the call center. If there are several call centers, the organization may provide several numbers, one for each call center, and the customer may be expected to use the number for the closest center, or for the center advertised to provide specifically the service he or she might need. In many cases the number provided will connect the caller with a first Service Control Point (SCP) which is adapted to pre-process incoming calls and forward the calls to call centers.

Routing of calls, then, may be on several levels. Pre-routing may be done at SCPs and further routing may be, and often is, accomplished at individual call centers. As described above, a call center typically involves a central switch, typically including an Automatic Call Distributor (ACD). The central switch is connected to the PSTN or other call network, as is well-known in the art. Agents, trained to interact with callers, service telephones connected to the central switch.

If the call center consists of just a central switch and connected telephone stations, the routing that can be done is quite limited. Current art telephony switches, although increasingly computerized, are limited in the range of computer processes that may be performed. For this reason additional computer capability in the art has been added for such central switches by connecting computer processors, adapted to run control routines and to access databases, to the central switch. The processes of incorporating computer enhancement to telephone switches is known in the art as Computer Telephony Integration (CTI), and the hardware and software together is referred to as CTI equipment. Typically the CTI processor, executing CTI applications, monitors the activity of the switch and status of calls and equipment, and issues instructions and commands to the switch.

In a CTI system, telephone stations having telephones connected to the central switch may be equipped also with computer terminals, so agents manning such stations may have access to stored data as well as being linked to incoming callers by a telephone connection. Such stations may be interconnected in a local area network (LAN) by any one of several known network protocols, with one or more servers also connected to the network, and the CTI processor connected on the network as well.

When a call arrives at a call center, whether or no the call has been pre-processed at a SCP, typically at least the telephone number of the calling line is made available to the receiving switch at the call center by a telephone carrier. This service is available by most PSTNs as caller-ID information in a format such as the well-known ANIS system (Automatic Number Identification System). If the call center is computer-enhanced (CTI), the phone number of the calling party may be used to access additional information from a database at a server on the network that connects the agent workstations. In this manner information pertinent to a call may be provided to an agent.

Even with present levels of CTI there are still problems in operating such call centers, or a system of such call centers. For example there are waiting queues with which to contend, and long waits may be experienced by some callers, while other agents may be available who could handle callers stuck in call-center queues. This condition is usually more prevalent in a large call-in center wherein a limited number of agents must field many calls. It is generally desired that waiting periods experienced by callers not be of such a length such that a caller becomes frustrated and terminates the call. However, it is witnessed by many who patronize call centers that much improvement is needed with regards to waiting time in call-center queues.

There are techniques practiced in the industry aimed at alleviating long caller-queue waiting periods. One such standard development involves call load-balancing wherein incoming calls are distributed (routed) more evenly to available call centers such that queue lengths individual to separate call centers are somewhat the same. This technique may also be practiced in single call centers wherein calls are distributed among separate groups of agents. While this technique helps to even out call loads among different queues, queue length may still be high during peak traffic periods.

Another technique involves transferring a call to an alternate destination when that call approaches a pre-set maximum queue-waiting time for an agent. The alternate destination may help to keep the caller on the line via interactive method such as reviewing the purpose of the call or perhaps advertising products, while waiting for an available agent. However, a long queue can still be an irritating factor for many callers, even when some form of entertainment such as music is provided.

The above-described techniques may help to stabilize overall queue waiting times within call centers, or help to alleviate caller stress when waiting time is excessive, but they only partially address the problem. At peak call-in periods queue waits may still be high even though calls are distributed evenly. Regardless of the distribution (routing) method used, callers are generally not informed of expected waiting time. Many callers who are not informed of an approximate waiting time will lose patience and terminate the call after a short wait if they believe that they will have to hold for much longer, even though in actuality, they may have terminated the call just prior to being transferred to an agent.

One prior art system is taught in U.S. Pat. No. 5,020,095 entitled Interactive Call Distribution Processor, filed on Nov. 16, 1988. This teaching provides a means for informing a caller of a calculated (estimated) call-waiting time in a queue. In this prior art system, however, the invention is limited in scope to an ACD switching system utilizing a strict first-in-first-out (FIFO) queue. In this system, a dedicated processor attached to a standard ACD switch performs the required calculating based on real-time performance related to call traffic including counting previously queued calls ahead of a caller and estimating waiting time based on an average of three calls against a pre-set time limit. If callers must be held in queue beyond the pre-set limit, then they are asked to select another destination, or they are disposed of by default.

While the above mentioned system technically provides for informing callers of an estimated queue-waiting time, it is somewhat crude and limited in scope. For example, in CTI telephony systems known to the present inventors, new skill-based routing routines have been developed. As a consequence agents may be qualified to participate in more than one queue. In other systems known to the present inventor, queues are not rigidly structured, and incoming calls may be inserted by priority ahead of calls already in a queue.

Advances in call routing using such as priority queues, virtual queues, and the like, include routing to agents based on skill-set of the agent (e.g. language, level of expertise, etc.), routing to agents based on level or state of availability, routing to agents based on pre-acquired and/or pre-stored caller information, routing to agents based on priority assignment of call, and so on. Rather, the queue is stacked according to assigned call priority. Moreover, priority routing may also be integrated with skill-based routing and other rules-based conventions.

In addition to priority queuing, virtual queues are also used in CTI enhanced environments. A virtual queue is a method for tokenizing a call wherein the caller may retain his position be it FIFO or priority queue after he has terminated the call. When his position is the next "call" to be handled, an automated or manual outbound dialer places a call to the original caller. When the caller answers, he is connected to the available agent chosen to handle the call.

In the prior art there is not disclosed a flexible method for estimating queue waiting times that could cover differing types of queues effectively. Moreover, other factors that may effect estimated waiting time (EWT) such as abandoned calls, redirected calls, error-routed calls, and the like are not considered or taken into account.

It is desired that methods for estimating call waiting times in queue be much refined so that such techniques may be practiced in vastly more complicated and flexible environments such as those known to the inventor and described above. Moreover, especially in CTI systems, there are further uses for estimated waiting times beyond informing callers. Such estimates may be used in many machine decision-making processes.

What is clearly needed is a method for estimating call waiting times for various types of queues including priority queues, virtual queues, and multiple-queue systems wherein advanced intelligent routing routines are commonly practiced. Such a method and apparatus would further improve enterprise-customer relations, and aid in increasing enterprise profit, as well as enhancing efficiency and accuracy in many CTI functions.

SUMMARY OF THE INVENTION

In a preferred embodiment of the present invention a method for estimating, by a processor coupled to a call waiting queue, waiting time for a designated call in the call-waiting queue, wherein a plurality of agents handle calls in multiple queues is provided, comprising steps of (a) determining the number of calls ahead of the designated call; (b) determining the historical average call handling time T(h) for calls in the queue; (c) for each agent handling calls in the queue determining the portion of the agent's time devoted to the queue; (d) determining an effective number of agents devoted to the queue by summing the time portions over all of the agents; and (e) multiplying the number of calls ahead from step (a) by the historical call handling time from step (b), and dividing the result by the effective number of agents determined in step (d).

In an alternative embodiment the method accounts for abandoned calls by additional steps of (f) determining an abandoned call rate; (g) determining not-abandoned call rate by subtracting the abandoned call rate from integer 1; and (h) multiplying the result of step (e) by the result of step (g).

In another aspect of the invention a call routing system is provided, comprising a switching apparatus for switching calls to a plurality of agent stations; a computer-telephony integration (CTI) processor coupled to the switching apparatus and adapted to maintain multiple routing queues by a plurality of enterprise rules, wherein agents are assigned to multiple queues; and an estimating application executing on the CTI processor and adapted for determining an estimated waiting time for a selected call in a selected queue. In this system the estimating application multiplies the number of calls ahead of the selected call in the selected queue by an historical average call handling time for calls in the queue, and divides the result by an effective number of agents devoted to the queue determined by summing, over all agents serving the queue either full or part time, the portions of each agents time devoted to the selected queue. In a further embodiment the system further accounts for abandoned calls by determining a non-abandoned call rate from an abandoned call rate and multiplying the estimated call waiting time determined in claim 3 by the result. One or more of the call waiting queues may be virtual queues or priority queues wherein newly arrived calls may be inserted in the queue by priority ahead of calls already in the queue.

In yet another aspect the invention assumes the form of a computer telephony integration (CTI) software application, comprising a counting function for determining the number of calls ahead of a designated call; a function for determining the historical average call handling time T(h) for calls waiting in the queue; a calculation function for retrieving the portion of time each agent assigned to the queue spends in tending to calls in the queue; a summation function for determining an effective number of agents devoted to the queue by summing the time portions over all of the agents; and a calculation function for determining the estimated waiting time by multiplying the number of calls ahead from the counting function by the historical call handling time, and dividing the result by the effective number of agents from the summation function. In this software there may be also a function for accounting for abandoned calls by determining a non-abandoned call rate from an abandoned call rate and multiplying the estimated call waiting time previously determined by the result.

With the innovations taught in the following disclosure in enabling detail, for the first time, a function and apparatus for estimating waiting is provided wherein users may reliably determine a close approximation of waiting time in sophisticated call waiting queues for announcement to callers and for other purposes as well.

BRIEF DESCRIPTION OF THE DRAWING FIGURES

DESCRIPTION OF THE PREFERRED EMBODIMENTS

Figure 1:
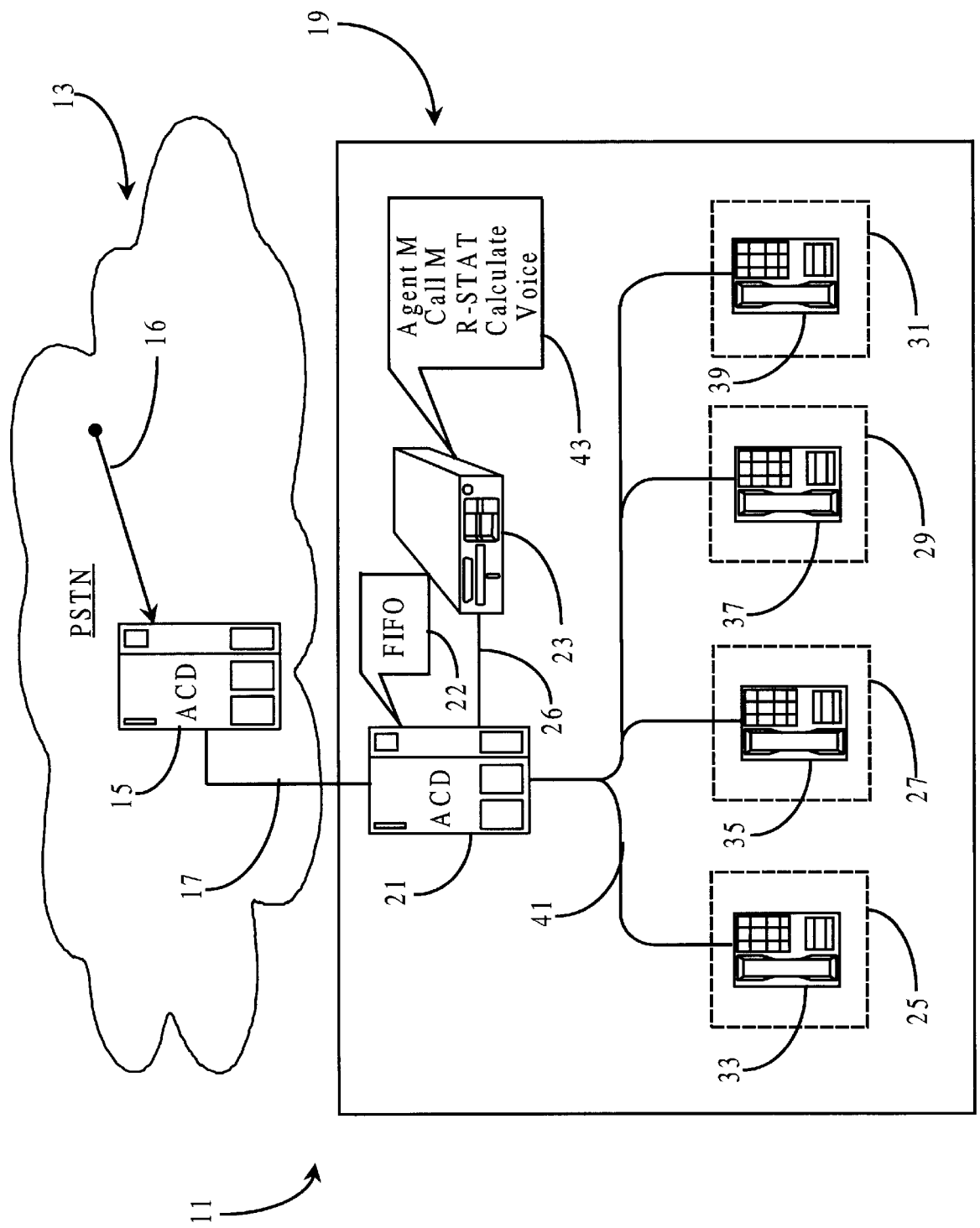
FIG. 1 is a block diagram illustrating a communication system having call-waiting estimation capability according to prior art.

FIG. 1 is a block diagram illustrating a communication system 11 wherein calculation of estimated waiting time (EWT) is practiced according to the prior art. As previously mentioned in the background section, prior art attempts to estimate call waiting time in call-center queues is rather limited in scope. The prior art approach cited in U.S. Pat. No. 5,020,095 assumes a limited hardware-fix that is applicable only for an ACD system wherein strict FIFO queuing is practiced. To further illustrate limitation in this approach, a prior art overview is illustrated below.

Communication system 11 comprises a PSTN 13 and a call-in center 19. System 11 uses the well known ACD-type telephony switching common to a COST network. For example, PSTN 13 has an ACD switch 15 connected therein and adapted to receive incoming calls represented by a vector 16 from anywhere in PSTN 13. ACD 15 is connected to an ACD central switch 21 within call-in center 19 via telephony trunk 17. ACD 21 is adapted as a central call-in switch and is a first destination for all calls 16 destined to call-in center 19.

As is known in the art, ACD 21 employs a FIFO queuing system 22 wherein calls 16 wait until an available representative is available to handle the call on a first-in first-out basis. ACD 21 is connected via an internal wiring system 41 to a plurality of telephones 33, 35, 37, and 39 which are implemented one-telephone-per to agent workstations 25, 27, 29, and 31. Call-in center 19 is not CTI enhanced to the extent that agents at workstations 25–31 have access to LAN connected PC's nor is call-in center 19 capable of much intelligent routing such as is possible in CTI enhanced environments. It is to this simple prior art system that EWT is implemented in rather limited scope as described above.

In order to achieve EWT in this prior art system, a call processor 23 is provided as a dedicated unit for estimating waiting time associated with FIFO queue 22. Processor 23 is connected to ACD 21 via a data control line 26. In prior art specification U.S. Pat. No. 5,020,095 which was mentioned above with reference to the background section, incoming trunks 17 are diverted through such a processor as processor 23 lending to the dedicated nature of the device as disclosed therein. However, it will be apparent to one with skill in the art that the same level of control over ACD 21 may be provided via control line 26 with the appropriate trunk interfaces installed in ACD 21. Processor 23 would not be considered a CTI processor in current art as intelligent routing applications are not incorporated therein.

Several EWT software routines are provided and installed in processor 23 and adapted, among other purposes, for monitoring and interfacing with calls 16 as they arrive in queue 22. Other capabilities include agent monitoring for busy or not busy, voice interface capability for informing callers of EWT, a means for calculating average call time per call, a means for counting calls ahead in queue 22, and a means for estimating EWT based on real-time averages obtained from most recent call-length statistics. Optional facilities (not shown) that may be connected to an ACD such as ACD 21 include a standard voice messaging facility, and one or more live operator attendants.

In operation of prior art system 11, incoming calls 16 arrive at ACD 15 in network 13 and are distributed over incoming trunk 17 to ACD 21 where they are queued (22) in the order that they arrive. Calls 16 are treated according to a pre-set queue limit, wherein once reached, a next caller is optionally informed via recorded message that the queue is full and offered another destination. The alternate option is to simply disconnect the call. Only if queue 22 is functioning below a pre-set limit is EWT practiced wherein a caller my be optionally informed of an estimated waiting time via one of a plurality of stored pre-recorded messages that is most closely associated with the current estimate which is based on the average time of the prior three completed calls.

The method and apparatus of this prior art example is inflexible with regards to other states that may exist. For example, a simplistic mathematical formula may be adopted to reflect this prior art example. The formula:

$$EWT = (N \times T_h)/m$$

N is the total calls in queue 22, $T_h$ is the average time handling each call, and m is the total sum of agents handling calls from queue 22. This formula, which can be considered a basic formula, would apply in this example. One limitation with this formula, as it applies to this case, is that it does not consider abandoned calls, unless such abandoned calls are figured in abandoned cal time, which is seldom the case A time estimate over three prior calls may include one or more abandoned calls thereby producing an unnaturally low average call-handling time that is communicated to the next caller arriving in queue. Moreover, EWT as communicated to a caller must take into account the number of calls ahead of his or her call in queue or N (total calls in queue). If there are many calls ahead multiplied by an unnaturally low average call handling time, the caller may receive a misleading time estimate.

Another problem with prior art as exemplified herein is that the actual time for handling calls may vary widely from call to call. Therefore, taking an average handling time over just a few calls (three in U.S. Pat. No. 5,020,095) is not reflective of a confident average as it is well known that accuracy of any average taken improves with the number of units (in this case calls) to be averaged. Still another state that is not considered in the prior art is the fact that agents in many cases may receive calls from more than one queue. Therefore, simply summing up the number of agents (m) working from one queue will not suffice as a portion of their time may be devoted to answering calls from another queue. Therefore, a more flexible treatment of EWT must be accomplished by way of revised formulas and added software in order to successfully and more accurately practice EWT. Such a flexible implementation of EWT is described in enabling detail below.

Figure 2:
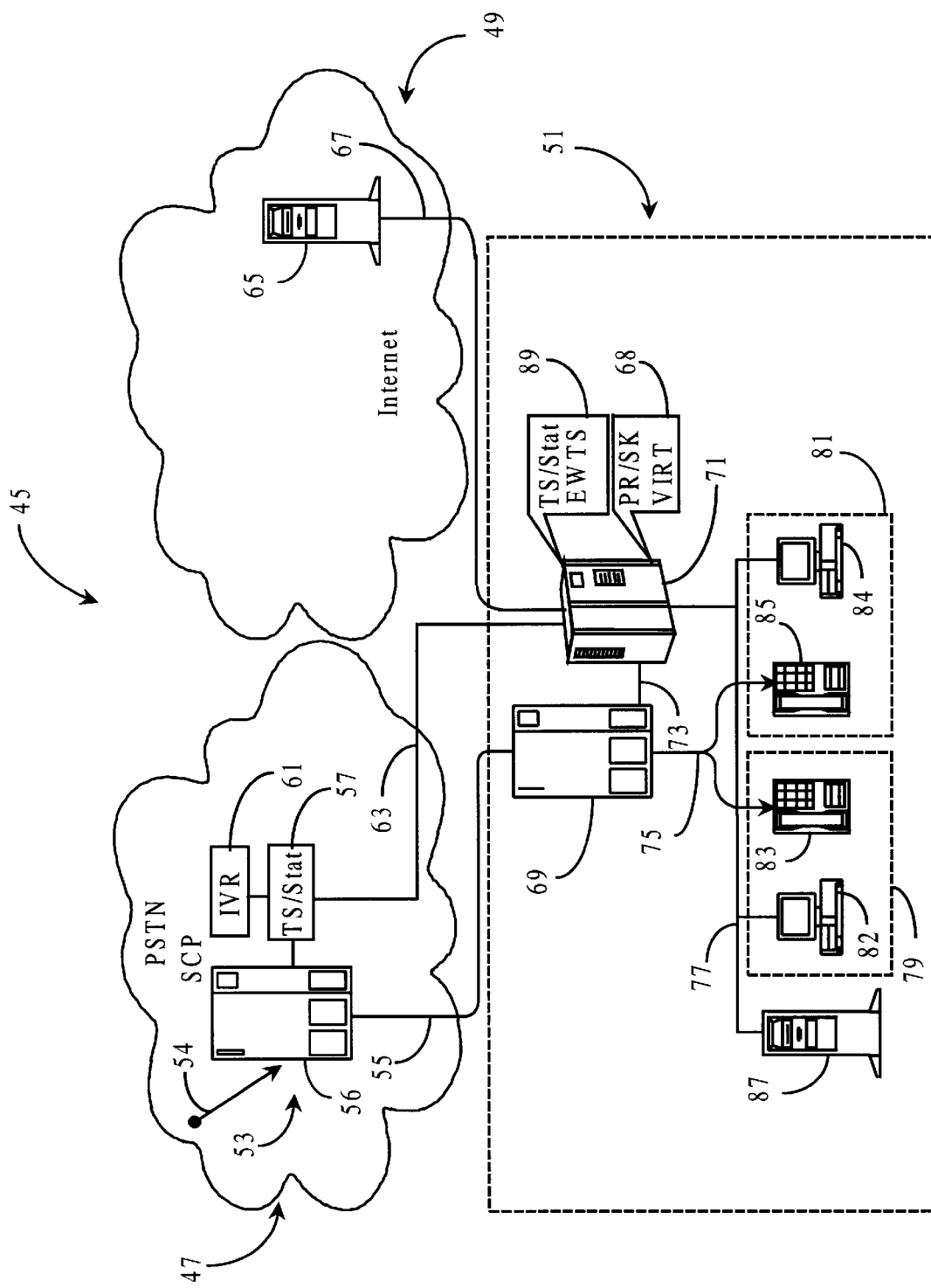
FIG. 2 is an overview of a CTI-enhanced telecommunications system wherein estimated-waiting time (EWT) may be practiced according to an embodiment of the present invention.

FIG. 2 is an overview of a CTI-enhanced telecommunications system 45 wherein EWT may be practiced according to an embodiment of the present invention. System 45 in this example comprises a PSTN network 47, an Internet network 49, and a communication center 51. PSTN 47 may be a public or private COST network as is known in the art. Internet 49 may be of the form of another data-packet network as is known in the art such as a private WAN or corporate Intranet. Communication center 51, in this embodiment, is capable of receiving incoming calls from both PSTN 47 and Internet 49, however, this is not required in order to practice the present invention.

A Service Control Point (SCP) 53, including a switching apparatus 56, is provided in PSTN 47 and adapted to receive incoming calls represented by vector 54 arriving from anywhere in PSTN 47. SCP 53 may comprise any known type of telephony switch, including an ACD type switch. Also illustrated within PSTN 47 and related to the SCP is a CTI processor 57 and a connected intelligent peripheral 61 of the form of an interactive voice response (IVR) unit. IVR 61 is adapted to interface with callers on incoming calls 54 in order to obtain additional information for routing purposes.

The purpose of SCP 53 at the network level is so that intelligent routing may be performed in PSTN 47 before calls are in the domain of communication center 51. For example, when a call 54 is intercepted by SCP 53, IYR 61 may interact with the caller to obtain further detail regarding purpose of the call, destination desired, level of skill required to service this caller, and many other parameters such as may be asked a caller. A separate digital network 63 is provided and connects processor 57 to a processor 71 within communication center 51. In this way pertinate information about a caller may be sent ahead of the actual call. In some cases only things like DNIS and ANI are used.

SCP 53 is connected via a telephony trunk or trunks 55 to a central telephony switch 69 within communication center 51. Actual incoming calls are routed to switch 69 over trunk 55 while any information obtained via IVR 61 (or otherwise) is transferred over digital network 63 to processor 71. Central switch 69 may be an ACD-type or other known telephony switch. Processor 71 provides computer enhancement to switch 69 via CTI connection 73. Processor 71 may also provide enhancement to switch 53 at the network level via digital network 63, processor 57, and CTI connection 59. This embodiment represents state-of-the-art communication technology on the COST side of communication system 45 as is known and available to the inventor.

Internet 49 is meant to illustrate, for purposes of discussion, that the method and apparatus of the present invention may be adapted and equated to data-network-telephony (DNT), and more particularly Internet-protocol-network-telephony (IPNT) as would be practiced with regard to Internet 49 and communication center 51 in this embodiment. However, for the purpose of this specification, most reference will be to practice of the present invention in a COST network.

Within communication center 51, there is illustrated a plurality of agent stations, station 79 and station 81. Stations 79 and 81 are each adapted and equipped to facilitate a communication center agent's duties with regard to communication center 51. For example, station 79 has implemented therein a personal computer/video display unit (PC/VDU) 82 and an agent's telephone 83. Communication station 81 is likewise equipped with a PC/VDU 84 and an agent's telephone 85. Agent's telephones 83, and 85 are connected to switch 69 via internal wiring 75 as is known in the art. There may be many more agent stations than the two illustrated.

Communication stations 79 and 81 are interconnected via their PC/VDU's to a LAN 77 for the purpose of obtaining and sharing information through the course of normal communication-center operation. A customer information system (CIS) server 87 is connected to LAN 77 and provides a source of information regarding customers, products, services, and other like information. Processor 71 also is LAN connected.

It will be apparent to one with skill in the art that there will be many more communication stations such as station 79 operating in an actual communication center of the type described herein. However, the inventor deems two such illustrated stations and components therein sufficient for the purpose of adequately explaining the present invention. It will also be apparent to one with skill in the art that LAN connected PCJVDU's, such as PC/VDU 82 connected to LAN 77, are not required in order to practice the present invention, but merely provide a state-of-the-art example of implemented equipment that may be used in facilitating communication-center business.

Processor 71 has software 89 installed therein for accomplishing methods of the present invention in a most flexible manner. For example, instances of T-server and Stat-server (conventions known to the inventor) provide required routing intelligence and statistical intelligence according to enterprise rules. An instance of EWT software is, in a preferred embodiment, integrated with T-server and Stat-server routines such that automated selection and execution of appropriate routines may ensue in accordance with any prevailing enterprise rules including number and type of queues used, specific routing routines, and so on. Software 89 may, in one embodiment, be provided as a single multifunction application.

Several queuing options 68 are provided and adapted to meet varying needs according to the type of enterprise and business model preferred, or currently practiced within communication center 51. As previously described with reference to the background section, prior art is generally limited in application to a FIFO type ACD queue. The software of the present invention (89), however, may be practiced with any type of queuing arrangement including the use of multiple queues. In this way, an enterprise may be flexible in approach. For example, EWT's may be calculated and communicated to callers and used for other purposes regardless of what type of queue the calls are in, FIFO, Priority, Skill-based, Virtual, and so on. It should be noted here that queues described wherein priority assignment, skill-based routing, agent status routing, and so on are instituted are still technically regarded as FIFO queues only in the sense that a progression is made with regards to calls coming in to queue and calls being answered from queue. The ability to stack queues and have calls advance according to various enterprise rules as disclosed with reference to co-pending application Ser. No. 09/024,825 would, of course, require more complex algorithms and statistical reporting in order to provide callers with a reasonably accurate EWT. Such capability is not available in prior art systems.

In order to accomplish accurate EWT in an intelligent routing environment such as system 45, the basic formula used for a simple FIFO ACD queue must be expanded, and better statistical handling and reporting must be observed as described above. In a preferred embodiment, statistical analysis and reporting of call behavior is provided via Stat-server shown as part of software 89. Stat-server software can be adapted to monitor and provide statistics regarding queues, switches, agent status, call traffic, and so on. This method is vastly superior over prior art. Statistical compilation capability may also be extended into PSTN 47 via digital network 63 and processor 57. Similarly, EWT and T-server capability may also be extended into PSTN 47 via the same conventions. In this way EWT may be provided at network level queues associated with SCP 53. More detail regarding expanded mathematical formulas and application thereof to various queue situations for practicing EWT is provided below. Also hierarchical systems can de assembled, where several call centers are connected to a network, and controlled by a common SCP.

Figure 3:
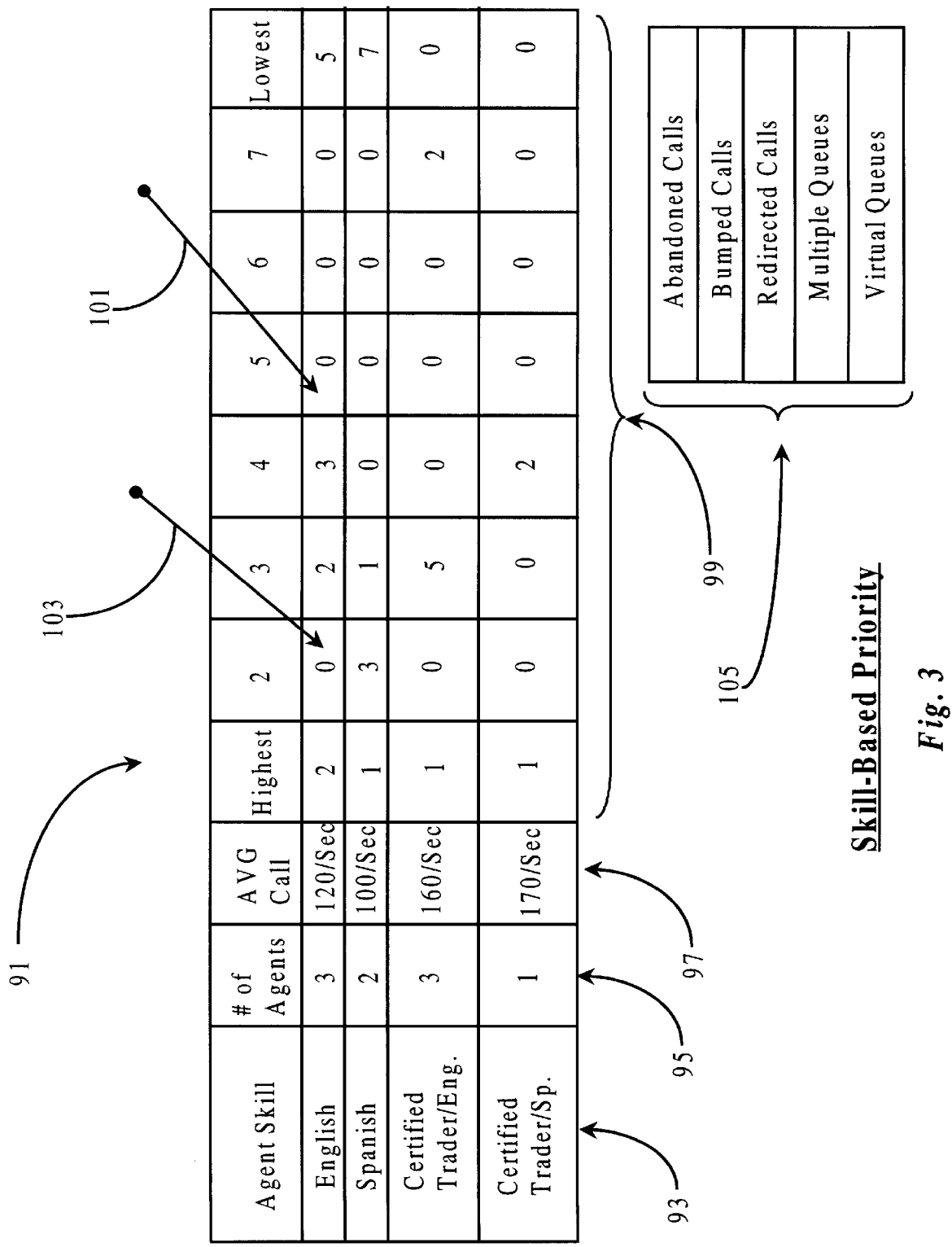
FIG. 3 is a table illustrating practice of the present invention in a skill-based priority queue.

FIG. 3 shows a table 91 illustrating practice of the present invention in a skill-based priority queue. Table 91 is intended to represent an exemplary skill-based priority queue similar to one disclosed with reference to specification Ser. No. 09/024,825 listed in the Cross-Reference to Related Documents section. In table 91 there is a column 93 in which agent-skill levels are listed. For example, English represents agents whose skill set is limited to the fact that they speak English. Spanish represents agents whose skill set is limited to the fact that they speak Spanish. Certified Trader/Eng. represents qualified and licensed traders who speak English. Certified trader/SP. represents qualified and licensed traders who speak Spanish.

Column 95 headed by title-block "# of Agents" represents the numbers of individual agents working at the skill levels illustrated in column 93. For example, there are 3 agents who are not certified traders who speak English and are assigned to answering calls from the queue. There are 2 Spanish speaking agents who are not certified traders answering calls from the queue. There are 3 certified traders who speak English and 1 certified trader who speaks Spanish answering calls from the queue. In this exemplary embodiment, there are a total of 9 agents assigned to answering calls from the queue. There is no duplication in the "number of agents" column.

A column 97 lists average call handling times for agents in each skill category under title-block "Avg. Call". For example the 3 English speaking agents who are not certified traders illustrated at the top left of table 91 have a combined call-disposal-time (CDT) of 120 seconds. This means that a call answered by one of these agents takes, on average, 120 seconds to dispose of from point of answer to point of termination. Likewise, Spanish speaking agents are averaging 100 seconds per call, certified traders speaking English are averaging 160 seconds per call, and certified traders who speak Spanish are averaging 170 seconds per call.

The above CDT figures are real-time numbers based on statistical reporting provided by Stat-server software as part of software 89 of FIG. 2. In a preferred embodiment, CDT averages take into account the rate of abandoned calls occurring within the queue and the amounts of time an agent may spend taking calls from another queue if there is more than one queue. These factors are randomly occurring events and are therefore impossible to account for when using the basic formula as described above.

An information table 105 lists some additional factors which can effect an EWT determination for an incoming call. These are abandoned calls (described above), bumped calls (priority queue), re-directed calls (error routed or transferred), use of multiple queues, and use of virtual queues.

Calls are stacked in queue according to priority and skill requirement of a caller. For example, in the column under title-block "Highest", the calls having the highest priority are listed according to skill requirement. To the right, columns labeled 2–7 and "lowest" reflect incremental lower levels of call priority with actual calls waiting listed according to skill requirement. For example, the lowest priority column has 5 calls listed and waiting for English speaking non-certified agents. There are 7 calls ahead of the 5 lowest priority calls. These are 3 calls in the fourth priority column, 2 calls in the third priority column, and 2 calls in the highest priority column. In this embodiment, calls having a same priority assignment in queue are answered according to FIFO rules, however a new call assigned a higher priority would be placed ahead of any lower priority calls in queue and behind any higher priority calls.

In this exemplary embodiment, a new call represented by vector 101 arrives and is assigned $5^{th}$ priority in the queue and requires an English speaking agent who does not have to be a certified trader. There are 7 calls ahead of call 101. Assuming then that another new call represented via a vector 103 arrives after call 101 and is assigned a $2^{nd}$ priority wherein an English speaking non-certified agent is required, the number of calls ahead with regards to call 101 increases by one. This assumes of course that all 3 English speaking agents are currently engaged with calls in the interim.

One with skill in the art may judge, from the preceding example, the difficulty of providing a reasonably accurate EWT relative to call 101 as higher priority calls may arrive and be placed in front in queue. Therefore, a periodic calculation is performed and caller 101 is periodically informed via IVR of any further delays, and perhaps given an option of increasing his priority or being transferred to another agent or queue.

By taking the basic prior art formula reproduced again below we can modify for different situations illustrated in information block 105 and described above.

$$EWT=(N \times T_h)/m \text{ (basic formula)} \qquad (I)$$

To account for a multiple queue factor in basic FIFO queuing wherein agents only spend a fraction of their time answering from any one queue, the basic formula is modified as follows:

$$EWT = (N \times T_h) \bigg/ \sum_{i=1}^{i=m} a_i. \qquad \text{II}$$

In this notation, a fraction ai represents the fraction of time an agent spends answering calls from a single queue i. These fractions (may vary with each agent) must be summed up over all of the agents answering calls from the queue. This result represents the effective number of agents for the calculations used as m in equation I.

When taking into account an abandoned call factor which is a random factor of EWT itself, the above notation is multiplied by the percentage of calls that are not expected to be abandoned as follows:

$$EWT = ((1 - r_a)(N \times T_h)) \bigg/ \sum_{i=1}^{i=m} a_i. \qquad \text{III}$$

In this equation, Γa is the rate of abandoned calls, so (1−Γa.) is the rate of not-abandoned calls. This rate is computed as a dynamically self adjusting factor which takes into account historical information on abandoned calls obtained from Stat-server statistics. It will be apparent to one skilled in the art of statistical calculation that the accuracy of this statistic will improve as more information on call behavior becomes available. This is but one example of how separate gathering of information by Stat-server software of software 89 of FIG. 2 is superior to prior art methods.

With the power of compiling statistical information concerning call behavior such as CDT, rate of abandoned calls, rate of calls bumped, swapped or redirected calls, and so on, a certain confidence level regarding the accuracy of these figures may be developed through further calculation. These calculations are, in a preferred embodiment, performed via EWT software in conjunction with Stat-server software of software 89 of FIG. 2.

In some systems callers are informed of the EWT for their call on a periodic basis while waiting in queue. In the case of a simple FIFO queue wherein no priority or other intelligent routines are employed, informing a caller of the EWT may be performed once at the beginning of his wait. One will appreciate, however, that in more complicated queue situations such as illustrated via table 91, wherein priority routing and the like is performed, a caller will appreciate being informed of any significant deviations of the original EWT as given at the beginning of his wait.

Statistical information and calculated results will, of course, be more accurate during peak periods when a high number of calls are being processed. Therefore, the method of the present invention is more reliable during periods of greater need. Callers during low-flow periods are usually handled expediently with much less time waiting in a queue. In one embodiment, a call threshold may be established in a queue so that callers waiting over a pre-set limit will be informed of an EWT in queue while callers expected to be disposed of before the pre-set threshold will not.

Taking a simple example such as provided herein with introduced call 101, EWT for caller 101 will be 2+2+2 (calls in a higher priority)×120 seconds (average CDT) divided by 3 (number of working agents). If caller 103 were introduced immediately thereafter before agents dispose of their current calls, then EWT for caller 101 would increase because of addition of call 103 which will be answered before call 101 because of priority. In this case, call 101 is bumped via call 103.

In some embodiments virtual queues are composed as a product of varying routing strategies employed within a communication center such as center 51 of FIG. 2. Virtual queues are often temporary, changing with differing routing routines employed. In a virtual queue, a call is represented by a token and the caller may hang-up and receive a call back when his or her call is next to be answered. More description regarding a virtual queue is provided with regard to co-pending patent application Ser. No. 09/024,825. The methods of the present invention may be employed with virtual queues with a high degree of success as long as the designer of the routing strategy provides meaningful objects from which statistics will be measured. Because of the integrative nature of components of software 89 of FIG. 2 namely, EWT, Stat-server, and T-server implementations, new routing strategies employing virtual queues may selectively obtain historical statistics related to the behavior of specific types of calls that may be generic to the new strategy.

It will be apparent to one with skill in the art that the method and apparatus of the present invention will work with any type of queue without departing from the spirit and scope of the present invention such as with above mentioned types. It will also be apparent to one with skill in the art that the present invention may be practiced at network level at such switches that may be connected to a CTI processor of the invention such as processor 57 of FIG. 2. Practice of the present invention with respect to IPNT telephony is also possible and contemplated. Therefore, the present invention should be afforded the broadest scope according to the disclosure. The spirit and scope of the present invention is limited only by the claims that follow.

What is claimed is:

1. A method for estimating, by a processor coupled to a call waiting queue, waiting time for a designated call in the call-waiting queue, wherein a plurality of agents handle calls in multiple queues, comprising steps of:

(a) determining the number of calls ahead of the designated call;

(b) determining the historical average call handling time T(h) for calls in the queue;

(c) for each agent handling calls in the queue determining the portion of the agent's time devoted to the queue;

(d) determining an effective number of agents devoted to the queue by summing the time portions over all of the agents; and (e) multiplying the number of calls ahead from step (a) by the historical call handling time from step (b), and dividing the result by the effective number of agents determined in step (d).

2. The method of claim 1 further adapted to account for abandoned calls by additional steps of (f) determining an abandoned call rate; (g) determining not-abandoned call rate by subtracting the abandoned call rate from integer 1; and (h) multiplying the result of step (e) by the result of step (g).

3. A call routing system comprising:

a switching apparatus for switching calls to a plurality of agent stations;

a computer-telephony integration (CTI) processor coupled to the switching apparatus and adapted to maintain multiple routing queues by a plurality of enterprise rules, wherein agents are assigned to multiple queues; and an estimating application executing on the CTI processor and adapted for determining an estimated waiting time for a selected call in a selected queue;

wherein the estimating application multiplies the number of calls ahead of the selected call in the selected queue by an historical average call handling time for calls in the queue, and divides the result by an effective number of agents devoted to the queue determined by summing, over all agents serving the queue either full or part time, the portions of each agents time devoted to the selected queue.

4. The call routing system of claim 3 wherein the estimating application further accounts for abandoned calls by determining a non-abandoned call rate from an abandoned call rate and multiplying the estimated call waiting time determined in claim 3 by the result.

5. The call routing system of claim 3 wherein one or more of the call waiting queues are virtual queues.

6. The call routing system of claim 3 wherein one or more of the multiple routing queues are priority queues wherein newly arrived calls may be inserted in the queue by priority ahead of calls already in the queue.

7. A computer telephony integration (CTI) software application, comprising:

a counting function for determining the number of calls ahead of a designated call;

a function for determining the historical average call handling time T(h) for calls waiting in the queue;

a calculation function for retrieving the portion of time each agent assigned to the queue spends in tending to calls in the queue;

a summation function for determining an effective number of agents devoted to the queue by summing the time portions over all of the agents; and a calculation function for determining the estimated waiting time by multiplying the number of calls ahead from the counting function by the historical call handling time, and dividing the result by the effective number of agents from the summation function.

8. The CTI application of claim 7 further comprising a function for accounting for abandoned calls by determining a non-abandoned call rate from an abandoned call rate and multiplying the estimated call waiting time previously determined by the result.

* * * * *

UNITED STATES PATENT AND TRADEMARK OFFICE
CERTIFICATE OF CORRECTION

PATENT NO.   : 6,157,655
DATED        : December 5, 2000
INVENTOR(S)  : Yuri Shtivelman et al.

It is certified that error appears in the above-identified patent and that said Letters Patent is hereby corrected as shown below:

Title page,
Item [74], Inventor, now reads "Yuri Shtivelman, Belmont, Calif." should read -- Yuri Shtivelman, Belmont, Calif.
Nikolay A. Anisimov, Walnut Creek, Calif.
Gregory Pogossiants, Palo Alto, Calif.
Vladimir N. Deryugin, Lafayette, Calif.
Dmytro G. Balkin, San Bruno, Calif.
Luben Gueorguiev Stoilov, Fairfax, Calif.

Signed and Sealed this

First Day of April, 2003

JAMES E. ROGAN
*Director of the United States Patent and Trademark Office*